United States Patent
Gringauz et al.

(10) Patent No.: US 12,322,103 B2
(45) Date of Patent: Jun. 3, 2025

(54) NETWORK ARCHITECTURE FOR 3D IMAGE PROCESSING

(71) Applicant: KONINKLIJKE PHILIPS N.V., Eindhoven (NL)

(72) Inventors: Asher Gringauz, Nesher (IL); Liran Goshen, Pardes-Hanna (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/721,224

(22) PCT Filed: Dec. 19, 2022

(86) PCT No.: PCT/EP2022/086725
§ 371 (c)(1),
(2) Date: Jun. 18, 2024

(87) PCT Pub. No.: WO2023/117953
PCT Pub. Date: Jun. 29, 2023

(65) Prior Publication Data
US 2024/0420325 A1 Dec. 19, 2024

(30) Foreign Application Priority Data
Dec. 21, 2021 (EP) ..................... 21216302

(51) Int. Cl.
*G06T 7/00* (2017.01)
(52) U.S. Cl.
CPC ........ *G06T 7/0012* (2013.01); *G06T 2200/04* (2013.01); *G06T 2207/20084* (2013.01); *G06T 2207/30004* (2013.01)

(58) Field of Classification Search
CPC .............. G06T 7/0012; G06T 2200/04; G06T 2207/20084; G06T 2207/30004; G06T 2207/10072; G06T 2207/20081
See application file for complete search history.

(56) References Cited

U.S. PATENT DOCUMENTS 9,947,102 B2   4/2018   Xu
10,346,986 B2  7/2019   Xu
(Continued)

FOREIGN PATENT DOCUMENTS

CN   109271992 A   1/2019
CN   110942464 A   3/2020
(Continued)

OTHER PUBLICATIONS

PCT International Search Report, International application No. PCT/EP2022/086725, Mar. 21, 2023.
(Continued)

Primary Examiner — Jon Chang
(74) Attorney, Agent, or Firm — Larry Liberchuk

(57) ABSTRACT

A mechanism for processing input 3D image data. In a first phase, the input 3D image data is separately processed using one or more neural networks to produce one or more modified 3D image data. In a second phase, the input 3D image data and the modified 3D image data are processed using neural networks to produce an output. The neural networks that produce the modified 3D image data are configured to process slices or sub-volumes of the input 3D image data to produce modified 3D image data.

14 Claims, 4 Drawing Sheets

(56) References Cited

U.S. PATENT DOCUMENTS

| | | | |
|---|---|---|---|
| 11,430,176 | B2 | 8/2022 | Levanony |
| 12,086,992 | B2 | 9/2024 | Yamazaki |
| 2020/0058126 | A1 | 2/2020 | Wang |
| 2020/0151879 | A1 | 5/2020 | Moradi |
| 2021/0225000 | A1 | 7/2021 | Guo |
| 2021/0225511 | A1* | 7/2021 | Kiraly ............... G06F 18/213 |
| 2021/0374947 | A1 | 12/2021 | Shin |
| 2023/0270376 | A1* | 8/2023 | Varadarajan ......... A61B 5/7264 600/408 |
| 2023/0410291 | A1* | 12/2023 | Heitz .................. G06T 7/0012 |

FOREIGN PATENT DOCUMENTS

| | | |
|---|---|---|
| CN | 111667488 A | 9/2020 |
| CN | 111862136 A | 10/2020 |
| CN | 112365560 A | 2/2021 |
| WO | WO20190136922 A1 | 7/2019 |
| WO | WO2021200209 A1 | 10/2021 |

OTHER PUBLICATIONS

Wang C. et al., "A Two-Stage 3D Unet Framework for Multi-Class Segmentation on Full Resolution Image", arxiv.org, Cornell University Library, 201 Olin Library Cornell University Ithaca, NY 14853, Apr. 12, 2018 (Apr. 12, 2018), XP080870068.

Ronneberger O. et al., "U-net: Convolutional Networks for Biomedical Image Segmentation", International Conference on Medical Image Computing and Computer-Assisted Intervention, MICCAI 2015, pp. 234-241, Nov. 2015.

Cicek Ö et al., "3D U-Net: Learning Dense Volumetric Segmentation from Sparse Annotation", proceedings of the International Conference on Medical Image Computing and Computer-Assisted Intervention, Athens, Greece, MICCAI 2016, pp. 424-432, Oct. 2016.

Gao H. et al., "Graph U-Nets", Cornell University, May 11, 2019.

Li X. et al., "H-DenseUNet: Hybrid Densely Connected UNet for Liver and Liver Tumor Segmentation from CT Volumes", IEEE Transactions on Medical Imaging, vol. 37 Issue 12, pp. 2663-2674, Dec. 2018.

Li C. et al., "Knee Orientation Detection in MR Scout Scans Using 3D U-Net", Proceeding of the SPIE11314, Medical Imaging 2020: Computer Aided Diagnosis, vol. 11314-1131430-1, Mar. 16, 2020.

Radiuk P. et al., "Applying 3D U-Net Architecture to the Task of Multi-Organ Segmentation in Computed Tomography", Applied Computer Systems, vol. 25, No. 1, pp. 43-50, May 2020.

Wang C. et al., "Fully Automatic Intervertebral Disc Segmentation Using Multimodal 3D U-Net", 2019 IEEE 43rd Annual Computer Software and Applications Conference (COMPSAC), vol. 1, pp. 730-739, IEEE 2019.

Baid U. et al., "A Novel Approach for Fully Automatic Intra-Tumor Segmentation With 3D U-Net Architecture for Gliomas", Frontiers in Computational Neuroscience, vol. 14, Article 10, Feb. 2020.

Yao H. et al., "Automatic Segmentation on Liver with 3D U-Net, Pixel Deconvolutional and Dense Transformer Network", International Journal of Radiation Oncology, Biology, Physics, 2020.

\* cited by examiner

NETWORK ARCHITECTURE FOR 3D IMAGE PROCESSING

FIELD OF THE INVENTION

The present invention relates to the field of neural network architectures, and in particular, to the processing of 3D image data using neural network architectures.

BACKGROUND OF THE INVENTION

There is an increasing interest in the automated processing of images, particularly 3D images. Although a wide variety of industries would benefit from improved 3D image processing, one particular area of interest is in the medical profession. The prevalence of 3D medical images is increasing, as they are produced by increasingly widespread 3D ultrasound, CT scans or MRI scans. Automated processing of such images would be helpful to aid a clinician in assessing and/or diagnosing an imaged subject, e.g. to perform a clinical assistive task.

Example image processing tasks that could be performed by an appropriately configured neural network architecture, processing 3D (medical) images, include object detection, object segmentation, noise removal, artifact removal, super-resolution and/or synthesis or predictions of other imaging modality results.

A wide variety of neural network architectures have been developed for the analysis of (medical) images. One of the most successful architectures is the U-net architecture.

There is an ongoing desire to improve the performance of neural network architectures that process 3D images.

US patent application US2020/058126 discloses a method for image segmentation of a 3D image using a fully convolutional neural network operating on a series of 2D slices.

SUMMARY OF THE INVENTION

The invention is defined by the claims.

According to examples in accordance with an aspect of the invention, there is provided a computer-implemented method for processing 3D image data using a neural network architecture.

The computer-implemented method comprises: obtaining input 3D image data; performing a modified 3D image data generation process comprising: for each of a plurality of 3D sub-volumes of the input 3D image data, processing the 3D sub-volume using a first neural network to produce first modified 3D image data; and for each 2D image slice along a first dimension of the input 3D image data, processing the 2D image slice using a second neural network to produce second modified 3D image data; and processing the input 3D image data, together with at least the first modified 3D image data and the second modified 3D image data, using an outputting neural network to produce an output of the neural network architecture.

The proposed approach provides a mechanism for improved analysis or processing of 3D image data, i.e. improved volumetric image processing. The proposed approach facilitates the use of a greater amount of contextual information for performing 3D image analysis, avoiding a natural restriction of receptive field size for processing of neural networks by incorporating wider bounds of data to be effectively processed at a same time.

It is recognized that many neural networks in current use were originally designed for 2D image processing. When moving to 3D, these neural networks start to become increasingly affected by the inherent 'curse of dimensionality' phenomena. For processing of 3D images particularly, this is manifested by limitations on the possible receptive field size of the network, which places an upper limit on the amount of context that is available when processing different parts of the 3D image. This restricted context bounds the power of the model, especially in processing systems having a limited memory or processing capability.

The proposed approach improves the amount of context that is made available when processing the input 3D image data using a neural network (here; the outputting neural network). This improves the performance of the image processing task performed by the neural network architecture.

The input 3D image data may consist of medical 3D image data. Embodiments are particularly advantageous when employed to process medical 3D image data, due at least to the prevalence and increasing clinical reliance upon medical 3D image data.

Preferably, the resolution of the input 3D image data and any modified 3D image data processed by the outputting neural network is the same.

The step of processing the input 3D image data, together with the second modified 3D image data and the first modified 3D image data, may comprise: for each 2D image slice along a second dimension of the input 3D image data, different to the first dimension: obtaining a corresponding 2D image slice from the first modified 3D image data and the second modified 3D imaging data; and processing the 2D image slice of the input 3D image data, together with at least the corresponding 2D image slice from the first modified 3D image data and the corresponding slice from the second modified 3D imaging data, using the outputting neural network to produce a processed 2D image slice, wherein the combination of the processed 2D image slices forms the output of the neural network architecture.

This approach provides, when processing slices along a particular dimension (the second dimension), context made available from at least one other dimension, in particular, data that would otherwise be only made available in other slices of the particular dimension.

Thus, for each slice of the 3D image in the particular dimension, information from other slices in the particular dimension can contribute to a processing of the said slice, as this information affects or contributes to the corresponding slices from the first and second modified 3D image data. This increases the effective receptive field of the processed 2D image slice, and thereby improves the performance of the overall neural network architecture.

The input 3D image data may be a medical image of a subject and each 2D image slice along the first dimension may be a slice lying in a coronal or sagittal plane of the subject and each 2D image slice along the second dimension may be a slice lying in an axial plane of the subject. However, embodiments are not limited thereto.

Each of the first, second and outputting neural networks may have a U-net architecture. A U-net architecture has been identified as providing good or superior (to other architectures) image processing capability, especially in the medical domain.

In some examples, the modified 3D image data generation process comprises: for each 2D image slice along a first dimension of the input 3D image data, processing the 2D image slice using a second neural network to produce second modified 3D image data; and for each of a plurality of 3D sub-volumes of the input 3D image data, processing the 3D sub-volume using a first neural network to produce first modified 3D image data.

Correspondingly, the processing the input 3D image data, together with at least the first modified 3D image data and the second modified 3D image data, may comprise processing the input 3D image data, together with at least the first modified 3D image data and the second modified 3D image data, using the outputting neural network to produce the output of the neural network architecture.

In some embodiments, the modified 3D image data generation process further comprises, for each 2D image slice along a third dimension of the input 3D image data, processing the 2D image slice along the third dimension using a third neural network to produce third modified 3D image data; the third dimension is different to the first dimension; and the processing the input 3D image data, together with at least the first modified 3D image data and the second modified 3D image data, comprises processing at least the input 3D image data, the second modified 3D image data and the third modified 3D image data using the outputting neural network to produce the output of the neural network architecture.

This approach provides even more contextual information usable when processing the input 3D image data, effectively providing contextual information from a third dimension. When the step of processing the input 3D image data, together with at least the first modified 3D image data and the second modified 3D image data makes use of a second dimension, the third dimension may be different to the second dimension.

Optionally, the step of processing the input 3D image data, together with at least the first modified 3D image data and the second modified 3D image data, comprises: for each 2D image slice along the second dimension of the input 3D image data: obtaining a corresponding 2D image slice from the second modified 3D image data; obtaining a corresponding 2D image slice from the third modified 3D image data and processing the 2D image slice of the input 3D image data, together at least with the corresponding 2D image slice from the second modified 3D image data and the corresponding slice from the third modified 3D imaging data, using the outputting neural network to produce a processed 2D image slice, wherein the combination of the processed 2D image slices forms the output of the neural network architecture.

The step of processing the input 3D image data, together with at least the first modified 3D image data and/or the second modified 3D image data, may comprise processing the input 3D image data, the first modified 3D image data, the second modified 3D image data and the third modified 3D image data using the outputting neural network to produce the output of the neural network architecture.

In some examples, the step of processing the input 3D image data, together with at least the first modified 3D image data and the second modified 3D image data, comprises: for each 2D image slice along the second dimension of the input 3D image data: obtaining a corresponding 2D image slice from the first modified 3D image data; obtaining a corresponding 2D image slice from the second modified 3D image data; obtaining a corresponding 2D image slice from the third modified 3D image data and processing the 2D image slice of the input 3D image data, together with at least the corresponding 2D image slice from the first modified 3D image data and the corresponding slice from the second modified 3D imaging data and the corresponding slice from the third modified 3D imaging data, using the outputting neural network to produce a processed 2D image slice, wherein the combination of the processed 2D image slices forms the output of the neural network architecture.

Optionally, the input 3D image data is a medical image of a subject; each 2D image slice along the first dimension is a slice lying in a coronal plane of the subject; each 2D image slice along the second dimension is a slice lying in an axial plane of the subject; and each 2D image slice along the third dimension is a slice lying in a sagittal plane of the subject.

The second neural network and the third neural network may be one and the same. Alternatively, the second neural network and the third neural network may be different.

Optionally, the size of each of the plurality of sub-volumes is no greater than one sixteenth of the size of the input 3D image data.

The method may further comprise a step of providing the output. This may comprise controlling a user interface to provide a user-perceptible output (e.g. a visual representation or audio representation) of the output and/or providing the output to a further processing system for further processing. It will be apparent that the output of a neural network architecture may provide useful information for performing one or more further processing tasks, e.g. a diagnosis tasks or a patient assessment task.

The output may be an output for use in a clinical assistive task.

The input 3D image data may consist of medical 3D image data, and the neural network architecture may be configured or trained to perform a clinical assistive task, e.g. identifying or predicting the presence or absence of a particular pathology in the medical 3D image data. Other suitable clinical assistive tasks (e.g. segmentation, denoising etc.) would be apparent to the skilled person.

There is also proposed a computer program product comprising computer program code means which, when executed on a computing device having a processing system, cause the processing system to perform all of the steps of any herein described method.

There is also proposed a processing system for processing 3D image data using a neural network architecture. The processing system is configured to: obtain input 3D image data; perform a modified 3D image data generation process comprising: for each of a plurality of 3D sub-volumes of the input 3D image data, processing the 3D sub-volume using a first neural network to produce first modified 3D image data; and/or for each 2D image slice along a first dimension of the input 3D image data, processing the 2D image slice using a second neural network to produce second modified 3D image data; and process the input 3D image data, together with at least the first modified 3D image data and the second modified 3D image data, using an outputting neural network to produce an output of the neural network architecture.

The processing system may be configured or adapted to perform the approach provided by any herein described method or mechanism, and vice versa.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
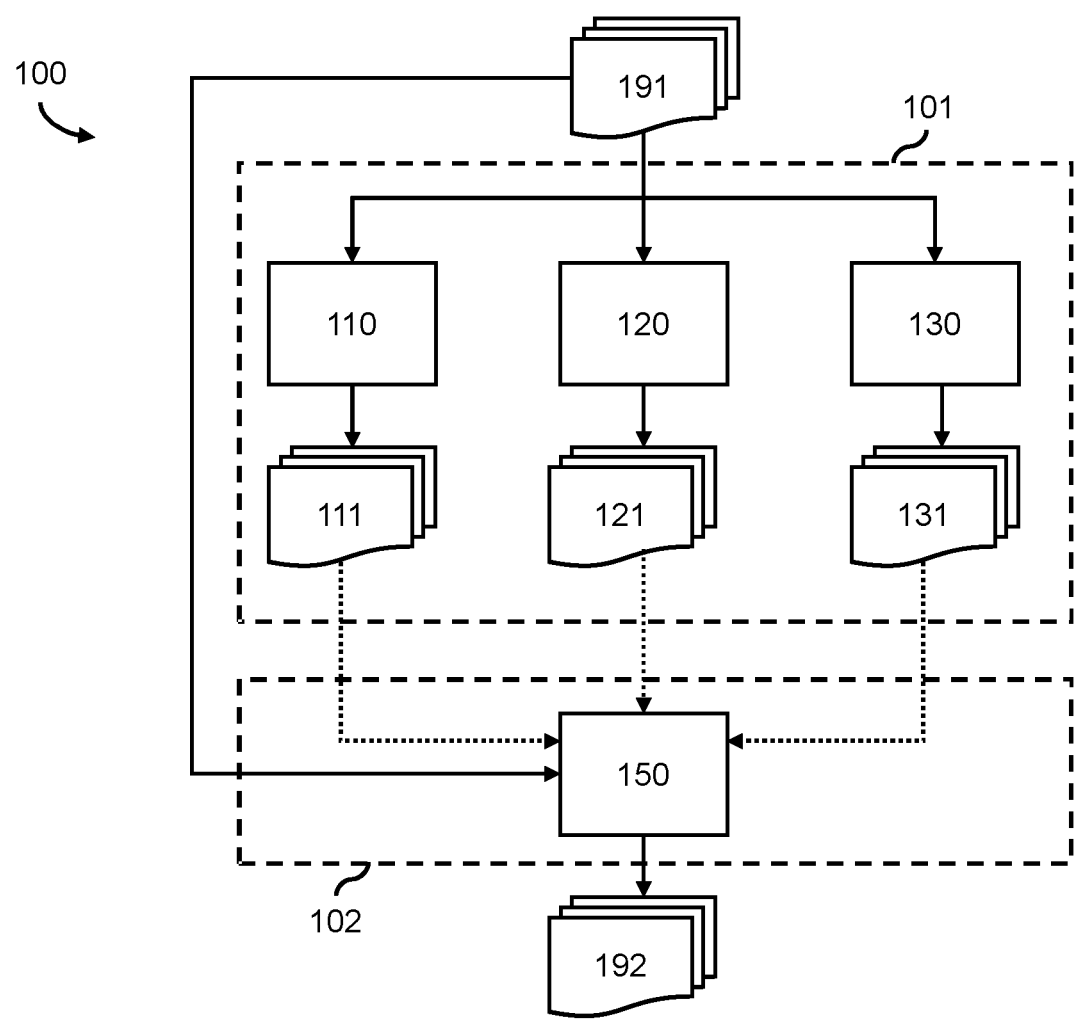
FIG. 1 illustrates a neural network architecture according to various embodiments.

The invention will be described with reference to the FIGS.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the FIGS. are merely schematic and are not drawn to scale. It should also be understood that the same reference numerals are used throughout the FIGS. to indicate the same or similar parts.

The invention provides a mechanism for processing input 3D image data. In a first phase, the input 3D image data is separately processed using one or more neural networks to produce one or more modified 3D image data. In a second phase, the input 3D image data and the modified 3D image data are processed using another neural network to produce an output. The one or more neural networks that produce the modified 3D image data are configured to process slices or sub-volumes of the input 3D image data to produce modified 3D image data.

Embodiments are based on the realization that existing approaches for processing 3D image data with a neural network are either too inefficient to efficiently perform on existing hardware, or lose potentially valuable (e.g. contextualizing) information across dimensions of the 3D image data. By using a two-phase approach, this contextual information can be included and/or provided as input to a neural network that produces an output.

Approaches disclosed by embodiments may be employed in a scenario in which the processing of 3D image data is desired. However, embodiments are particularly advantageous in the medical domain, e.g. for the processing of medical 3D image data. In this field, a large amount of 3D image data is generated, and it would be useful to improve an efficiency of processing such a large volume of possible data.

In the context of the present invention, an image slice is a two-dimensional section of three-dimensional or volumetric image data.

It will be appreciated that an image slice can be extracted with respect to three different dimensions of the three-dimensional image data. An image slice "along a dimension" is an image slice at a particular position of that dimension. Thus, if 3D image data has dimensions [x,y,z], an image slice along dimension z would have dimensions [x,y].

In the context of the present disclosure, image slices correspond to one another if they contain or represent a same scene, i.e. represent a same imaging region.

FIG. 1 conceptually illustrates an approach adopted by embodiments of the invention. In particular, FIG. 1 illustrates a neural network architecture 100 illustrating various components that can be used in embodiments of the invention.

The network architecture 100 is configured to process input 3D image data 191 to produce an output 192.

The output 192 may itself comprise 3D image data, such as a denoised version of the input 3D image data 191, an upsampled or higher resolution version of the input 3D image data 191 or synthesized image data. Alternatively, the output 192 may comprise some other possible neural network output of a 3D image, such as segmentation mask or a predictive indicator. Other suitable examples will be apparent to the person skilled in the art.

The network architecture 100 is split into two phases.

In a first phase 101 the input 3D image data 191 is separately processed by one or more first phase neural networks 110, 120, 130. Each first phase neural network produces modified 3D image data 111, 121, 131.

One suitable example of a first phase neural network is a neural network that processes a chunk or block of 3D image data, e.g. a sub-volume of the input 3D image data. Such a neural network may be labelled a 3D sub-volume neural network. By way of example, the neural network architecture may be configured such that a first neural network 110 processes different sub-volumes of the input 3D image data to produce first modified 3D image data 111.

The size of each sub-volume may be no greater than one sixteenth of the size of the input 3D image data. This reduces a processing power required to process the input 3D image data using the 3D sub-volume neural network.

Another suitable example of a first phase neural network is a neural network that processes 2D image data or image slices. Such a neural network may be labelled a 2D image slice neural network. Each image slice lying along a particular dimension of the input 3D image data is processed using such a 2D image slice neural network to produce modified 3D image data. Processing an image slice may comprise generating a processed or modified image slice.

By way of example only, a second neural network 120 may process image slices along a first dimension of the input 3D image data 191 to produce second modified 3D image data 121. In a further example, a third neural network 130 may process image slices along a different dimension to the first dimension of the input 3D image data 191 to produce third modified 3D image data 131.

Although not specifically illustrated, the second and third neural networks may be one and the same (i.e. identical). This allows both a reduction of the size of the neural network architecture and augmentation of the training data. In other examples, the second and third neural networks may be independent, e.g. trained with different sets of training data.

As an example, where the input 3D image data is image data of a subject, each slice in the first dimension may be a slice lying in one of the sagittal, coronal or axial planes of the subject.

In a second phase 102, the input 3D image data 191 and at least one of the modified 3D image data 111, 121, 131 are processed by a second phase neural network 150 or outputting neural network to produce the output 192.

The second phase neural network (or "outputting neural network") may be configured to iteratively process sets of slices of image data. Each set of slices comprises an image slice of the input 3D image data and a corresponding image slice from one or more of the modified 3D image data. Each set of slices corresponds to a different position in a second dimension. The second dimension is different to the first dimension.

The second neural network 120 may process image slices along a first dimension of the input 3D image data 191 to produce second modified 3D image data 121. The outputting neural network may process images slices along a second dimension of the input 3D image data (together with corresponding slices from one or more modified 3D image data) to produce the output; and the third neural network 130 may process image slices along a third dimension of the input 3D image data 191 to produce third modified 3D image data 131. The first, second and third dimensions may all be different.

Where the input 3D image data is image data of a subject, each slice in the first dimension may be a slice lying in one of the sagittal, coronal or axial planes of the subject. Each slice in the second dimension may be a slice lying in a different one of the sagittal, coronal or axial planes of the subject. If present, each slice in a third dimension may be a slice lying in the last of the sagittal, coronal or axial planes of the subject.

In particular, when the input 3D image data is image data of a subject, each slice in the first dimension may be a slice lying in a sagittal or coronal plane of the subject. Each slice in the second dimension may be a slice lying in an axial plane of the subject. If present, each slice in a third dimension may be a slice lying in the other of the sagittal and coronal plane of the subject.

Thus, in the second phase 102, two, three or four input channels of 2D images may be defined. A first channel is for a slice of the input 3D image data. The remaining channels are for a respective and corresponding slice from each of the first and second (and optionally third) modified image data produced by the first phase neural network(s) in the first phase 101.

Put yet another way, in the second phase 102, for each 2D image slice along a second dimension of the input 3D image data 191, a corresponding 2D image slice from the first modified 3D imaging data 111 and second modified 3D image data 121 (and optionally the third modified 3D image data 131) is obtained. The 2D image slice of the input 3D image data is then processed, together with any obtained corresponding 2D image slices, using the second phase neural network 150 (also called the outputting neural network) to produce a processed 2D image slice. The combination of the processed 2D image slices (produced by processed each 2D image slice of the input 3D image data) forms the output of the neural network architecture 100.

The output of the second phase neural network 150 may therefore comprise one-channel result image data.

However, it will be appreciated that the precise processing performed by each neural network in the neural network architecture may differ depending upon the intended purpose or objective of the neural network architecture 100, i.e. the output 192.

In some embodiments, each neural network is trained or configured for a same purpose, e.g. with an intent to produce or predict a same output.

For instance, if the purpose of the neural network architecture 100 is to synthesize 3D image data of a different modality to the input 3D image data, each neural network may be trained or configured for synthesizing the 3D image data of the different modality from the input 3D image data.

As another example, if the purpose of the neural network architecture 100 is to denoise 3D image data, each neural network may be trained or configured for denoising the input 3D image data 191.

However, embodiments are not restricted to this limitation.

For instance, the first phase neural networks may be trained or configured for use in generating modified 3D image data (e.g. denoised 3D image data or increased contrast 3D image data) and the second phase neural network is trained or configured for use in predicting or identifying the presence of a certain pathology in the input 3D image data.

As another example, the first phase neural networks 110, 120, 130 may be trained or configured for use in generating modified 3D image data (e.g. denoised 3D image data or increased contrast 3D image data) and the second phase neural network may be trained or configured for use in segmenting the input 3D image data.

As yet another example, the first phase neural networks 110, 120, 130 may be trained or configured for use in generating modified 3D image data (e.g. denoised 3D image data or increased contrast 3D image data) and the second phase neural network 150 may be trained or configured for use in synthesizing 3D image data of a different modality to the input 3D image data.

Other suitable examples will be apparent to the skilled person.

Embodiments make use of neural networks to process image data (e.g. 2D image slices or chunks of 3D image data) to produce an output.

The structure of a neural network is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a neural network are well known. Typically, such methods comprise obtaining a training dataset, comprising training input data entries and corresponding training output data entries. An initialized neural network is applied to each input data entry to generate predicted output data entries. An error between the predicted output data entries and corresponding training output data entries is used to modify the neural network. This process can be repeated until the error converges, and the predicted output data entries are sufficiently similar (e.g. ±1%) to the training output data entries. This is commonly known as a supervised learning technique.

For example, weightings of the mathematical operation of each neuron may be modified until the error converges. Known methods of modifying a neural network include gradient descent, backpropagation algorithms and so on.

In particularly advantageous embodiments, each neural network of the neural network architecture has a U-net architecture. U-Net and its 3D version, 3D U-Net, are considered to provide some of the standard and most successful CNN architectures for image processing tasks.

Figure 2:
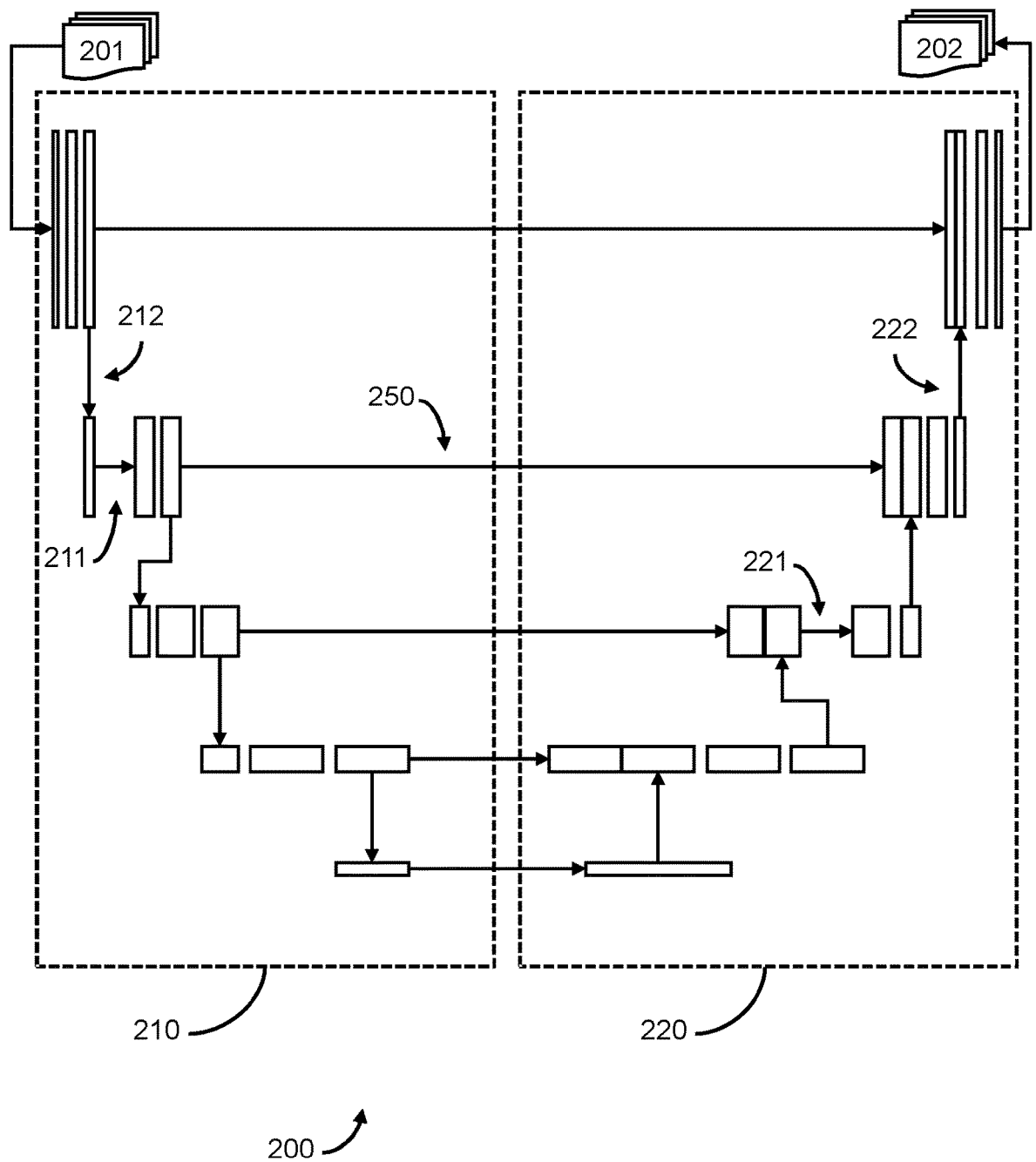
FIG. 2 illustrates a U-net neural network architecture.

FIG. 2 illustrates a neural network 200 having a basic U-net architecture, which is formed of two paths: a contracting path 210 and an expansive path 220. The neural network process an input 201 to produce an output 202.

The contracting path consists of a series of levels/blocks formed of layers, such as convolution 211 layers and pooling layers 212. The expansive path consists of a series of levels/blocks formed of layers, such as convolution layers 221 and up-convolution/up-sampling layers 222. The number of levels/blocks in the expansive path is the same as the number of levels/blocks in the contracting path. The number of pooling layers in the contracting path 210 (and therefore the number of up-convolution layers in the expansive path 220) defines the number of levels/blocks in each path, and therefore the depth of the U-net. In the illustrated example, the depth of the neural network is 4.

There may be one or more feed-forward links 250 between the same levels on the contracting path and the expansive path, as illustrated.

Investigations of the relationship between network depth and performance show that the performance usually improves with the depth of the network, usually up until a depth of four.

A more complete explanations of the basic (2D) U-net architecture is provided by Ronneberger, Olaf, Philipp Fischer, and Thomas Brox. "U-net: Convolutional networks for biomedical image segmentation." International Conference on Medical image computing and computer-assisted intervention. Springer, Cham, 2015.

An explanation of a suitable 3D U-net architecture is provided by Özgün Çiçek, Ahmed Abdulkadir, Soeren S. Lienkamp, Thomas Brox, Olaf Ronneberger. 3D U-Net: Learning dense volumetric segmentation from sparse annotation. In Proceedings of the International Conference on Medical Image Computing and Computer-Assisted Intervention, Athens, Greece, 17-21 Oct. 2016.

As a working example, an evaluation of the proposed network architecture on CT volumetric data has been performed. In this working example, each neural network of the neural network architecture is trained to synthesize monochromatic 50 keV results from conventional CT volumetric data.

For this working example, the training dataset for each neural network consisted of 14 separate clinical studies with total of 6,552 slices. All the studies were abdomen scans reconstructed with a filtered back projection algorithm, slice thickness 1 mm, slice increment 0.9 mm or 1 mm and field of view between 350 mm to 425 mm.

Six neural network architectures were trained for generating an output.

A first neural network architecture uses a first two-dimensional neural network, i.e. a neural network that processes image slices only. Each image slice along a first dimension of the input 3D image data is processed using the first two-dimensional neural network to produce first output 3D image data. The first two-dimensional neural network employs a U-net architecture with a depth of four.

A second neural network architecture uses a single three-dimensional neural network to process the input 3D image data. More specifically, the single three-dimensional neural network processes a chunk/block/sub-volume of the input 3D image data, which is performed across the entire input 3D image data (with a padding). Thus, the input 3D image data is divided into chunk/sub-volumes, which are each processed by the single three-dimensional neural network process to produce second output image data.

A third neural network architecture uses a second two-dimensional neural network, i.e. a neural network that processes image slices only. Each image slice along a second and/or third dimension of the input 3D image data is processed using the second two-dimensional neural network to produce output 3D image data. Processing image slices along the second dimension produces third output image data. Processing image slices along the third dimension produces fourth output image data. The second two-dimensional neural network employs a U-net architecture with a depth of four.

A fourth neural network architecture uses a third two-dimensional neural network. The input to the third two-dimensional neural network is an image slice from the input 3D image data and an image slice from the second output image data (the output of the second neural network architecture). Each image slice is an image slice obtained along a first dimension. Thus, a third two-dimensional neural network receives two-channel input: 1) an image slice from the conventional input image data, and 2) an image slice from the output of the second neural network architecture. Multiple image slice sets (each set containing a slice for each channel) are individually processed by the third two-dimensional neural network to produce fifth output image data. Each image slice set corresponds to a different position along a particular dimension (e.g. where input image data contains medical imaging data—a different axial, coronal or sagittal image). The depth of the third two-dimensional neural network is four.

A fifth neural network architecture uses a fourth two-dimensional neural network. The input to the fourth two-dimensional neural network is an image slice from the input 3D image data, an image slice from the third output image data and an image slice from the fourth output image data. Each image slice is an image slice obtained along a first dimension. Thus, the fourth two-dimensional neural network receives three-channel input: 1) an image slice from the conventional input image data; 2) an image slice from the third output image data; and 3) an image slice from the fourth output image data. Multiple image slice sets (each set containing a slice for each channel) are individually processed by the fourth two-dimensional neural network to produce sixth output image data. Each image slice set corresponds to a different position along a particular dimension (e.g. where input image data contains medical imaging data—a different axial, coronal or sagittal image).

A sixth neural network architecture uses a fifth two-dimensional neural network. The input to the fifth two-dimensional neural network is an image slice from the input 3D image data, an image slice from the second output image data; an image slice from the third output image data; an image slice from the fourth output image data. Each image slice is an image slice obtained along a first dimension. Thus, the fifth receives four-channel input: 1) an image slice from the conventional input image data; 2) an image slice from the second output image data; 3) an image slice from the third output image data; and 4) an image slice from the fourth output image data. Multiple image slice sets (each set containing a slice for each channel) are individually processed by the fifth two-dimensional neural network to produce seventh output image data. Each image slice set corresponds to a different position along a particular dimension (e.g. where input image data contains medical imaging data—a different axial, coronal or sagittal image).

For the purposes of the present evaluation: image slices in the first dimension are images lying in or parallel to the axial plane; image slices in the second dimension are images lying in or parallel to the coronal plane; and image slices in the third dimension are images lying in or parallel to the sagittal plane.

The evaluation results are summarized in Table 1 below.

TABLE 1

| Network Architecture | Depth of U-net | L1 (HU) | Improvement over 1st NNA | L2 (HU) | Improvement over 1st NNA |
|---|---|---|---|---|---|
| First | 4 | 7.74 | | 13.71 | |
| Second | 2 | 7.71 | | 14.73 | |
| Fourth | 4 and 2 | 5.66 | 26.9% | 8.66 | 36.8% |
| Fifth | 4, 4 and 4 | 6.01 | 22.4% | 8.41 | 38.7% |
| Sixth | 4, 4, 4, and 2 | 5.61 | 27.5% | 7.92 | 42.2% |

In Table 1, L1 represents the value of a first loss function L1(.), which is the sum (across all pixels of the output image data produced by the relevant network architecture) of the absolute differences between the true value and the predicted value for each pixel. L2 represents the value of a second loss function L2(.), which is the sum (across all pixels of the output image data produced by the relevant network architecture) of the squared differences between the true value and the predicted value for each pixel.

The true value of a pixel is contained in ground truth image data, being image data obtained by a CT scanner operating in a monochromatic 50 keV mode. The predicted value of a pixel is contained in the output image data provided by the relevant network architecture. The output image data is configured to attempt to predict the content of the ground truth image data.

It can be seen that the proposed approach improves the results. In particular, the proposed approach (embodied by the fourth, fifth and sixth neural architectures) exhibit a marked improvement over the currently existing and available neural network architectures (represented by the first and second neural network architectures).

Figure 3:
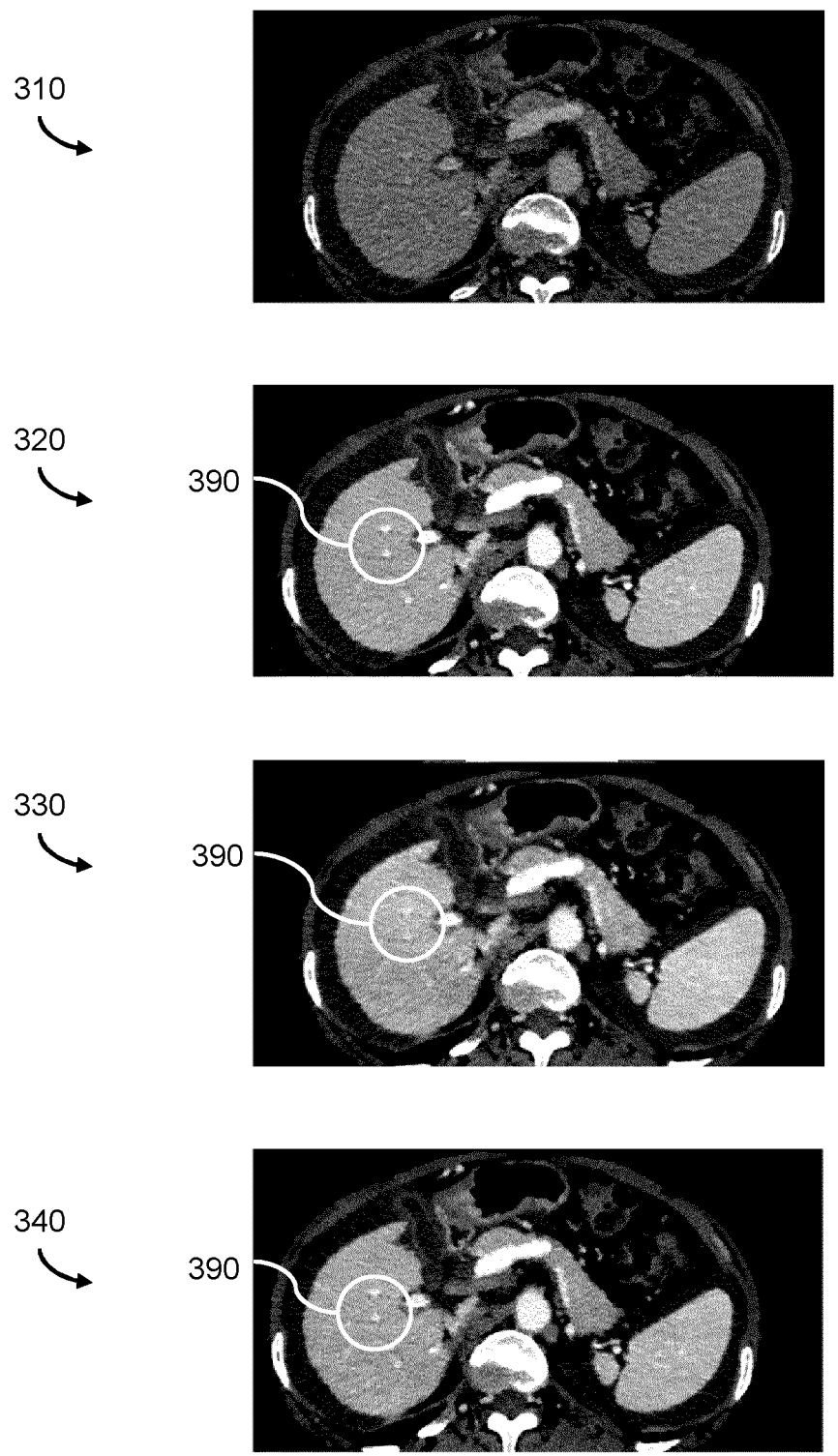
FIG. 3 provides example images illustrating an effect of embodiments.

FIG. 3 further demonstrates the advantage of the proposed approach.

FIG. 3 provides four representative image slices, each illustrating a same scene, namely a same portion of the abdomen of a subject.

A first image slice 310 is an image slice taken from conventional CT 3D image data. A second slice 320 is an image slice taken from 3D image data obtained by a CT scanner operating in a monochromatic 50 keV mode. A third slice 330 is an image slice taken from the output image data generated by processing the conventional CT 3D image data using the first neural network architecture. A fourth slice 340 is an image slice taken from the output image data generated by processing the conventional CT 3D image data using the sixth neural network architecture.

The second slice 320 effectively represents the "ground truth" image data that the neural network architectures are attempting to reconstruct from the conventional CT 3D image data.

It can be seen that the fourth slice more closely resembles the second slice, compared to the third slice. That is, the difference between the fourth slice 340 and the second slice 320 is less than the difference between the third slice 330 and the second slice 320. This distinction is perhaps most clearly apparent in the marked region 390.

Figure 4:
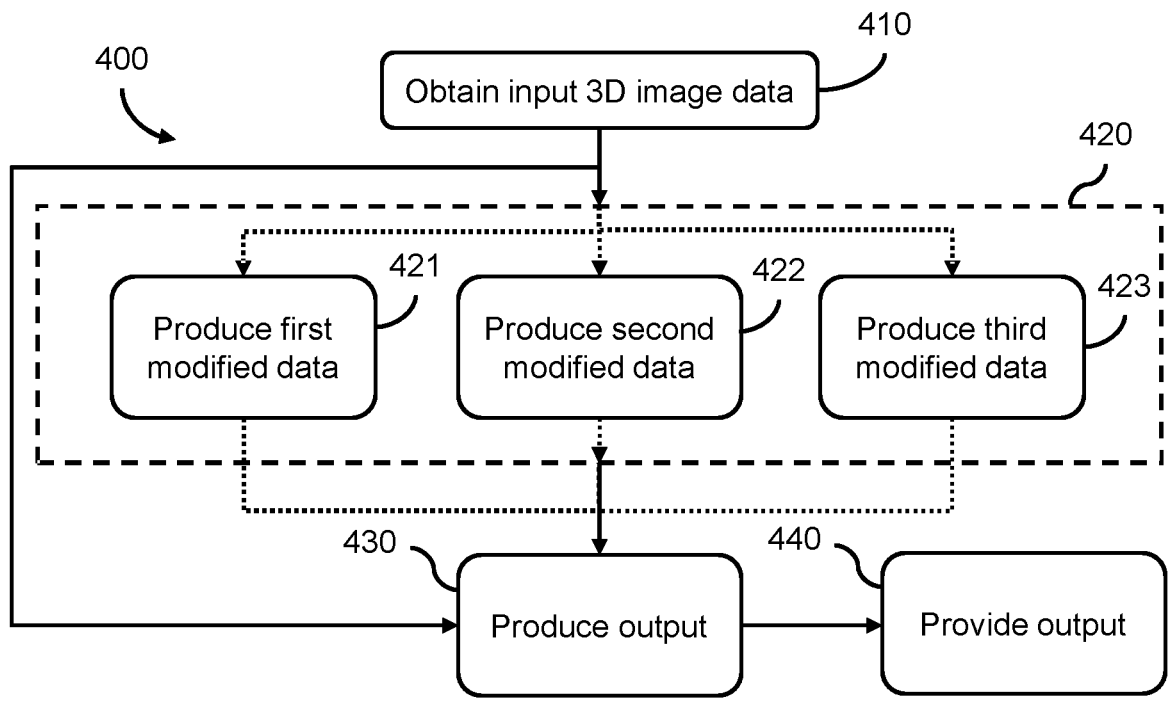
FIG. 4 is a flowchart illustrating a method according to an embodiment.

FIG. 4 illustrates a computer-implemented method 400 according to an embodiment. The method 400 is for processing 3D image data using a neural network architecture.

The method 400 comprises a step 410 of obtaining input 3D image data. The input 3D image data may, for instance, be a medical image of a subject. However, other suitable examples of 3D image data will be apparent to the skilled person.

Step 410 may comprise receiving the input 3D image data from a processing system, e.g. an imaging system that generates medical 3D images. In other examples, step 410 may comprise retrieving the input 3D image data from a memory or storage unit.

The method 400 further comprises a process 420 of performing a modified 3D image data generation process. The modified 3D image data generation process generates one or more modified image data, each being a modified version of the input 3D image data.

In particular, process 420 comprises performing step 421 and step 422.

Step 421 comprises for each of a plurality of 3D sub-volumes of the input 3D image data, processing the 3D sub-volume using a first neural network to produce first modified 3D image data.

Step 422 comprises for each 2D image slice along a first dimension of the input 3D image data, processing the 2D image slice using a second neural network to produce second modified 3D image data.

The first and second neural networks may be embodied as first phase neural networks as previously described.

After performing step 420, method 400 performs a step 430 of processing the input 3D image data, together with at least the first modified 3D image data and the second modified 3D image data, using an outputting neural network to produce an output of the neural network architecture. The outputting neural network is functionally equivalent to the second phase neural network previously described.

Step 430 thereby comprises processing the input 3D image data and any modified 3D image data generated by the process 420 to produce an output. The output may itself comprise 3D image data, such as a denoised version of the input 3D image data, an upsampled or higher resolution version of the input 3D image data or synthesized image data. Alternatively, the output may comprise some other possible neural network output of a 3D image, such as segmentation mask or a predictive indicator. Other suitable examples will be apparent to the person skilled in the art.

In some examples, step 430 comprises, for each 2D image slice along a second dimension of the input 3D image data, different to the first dimension (if used): obtaining a corresponding 2D image slice from the first modified 3D image data and the second modified 3D imaging data; and processing the 2D image slice of the input 3D image data, together with at least the corresponding 2D image slice from the first modified 3D image data and the corresponding slice from the second modified 3D imaging data, using the third neural network to produce a processed 2D image slice. The combination of the processed 2D image slices forms the output of the neural network architecture.

In some embodiments, when process 420 comprises performing step 421, the process may also comprise performing step 423. Step 423 comprises, for each 2D image slice along a third dimension of the input 3D image data, processing the 2D image slice along the third dimension using a third neural network to produce third modified 3D image data. The third dimension is different to the first dimension and the second dimension.

Step 430 may be appropriately adapted to comprise processing at least the input 3D image data, the first modified 3D image data and the third modified 3D image data using the third neural network to produce the output of the neural network architecture.

Of course, step 430 may comprise processing the input 3D image data, the first modified 3D image data, the second modified 3D image data and the third modified 3D image data using the third neural network to produce the output of the neural network architecture.

The method 400 may further comprise a step 440 of providing the output. Step 440 may comprise, for instance, controlling a user interface to provide a user-perceptible output (e.g. a visual representation or audio representation) of the output produced in step 430. As another example, step 440 may comprise providing the output to a further processing system for further processing. It will be apparent that the output of a neural network architecture may provide useful information for performing one or more further processing tasks.

Figure 5:
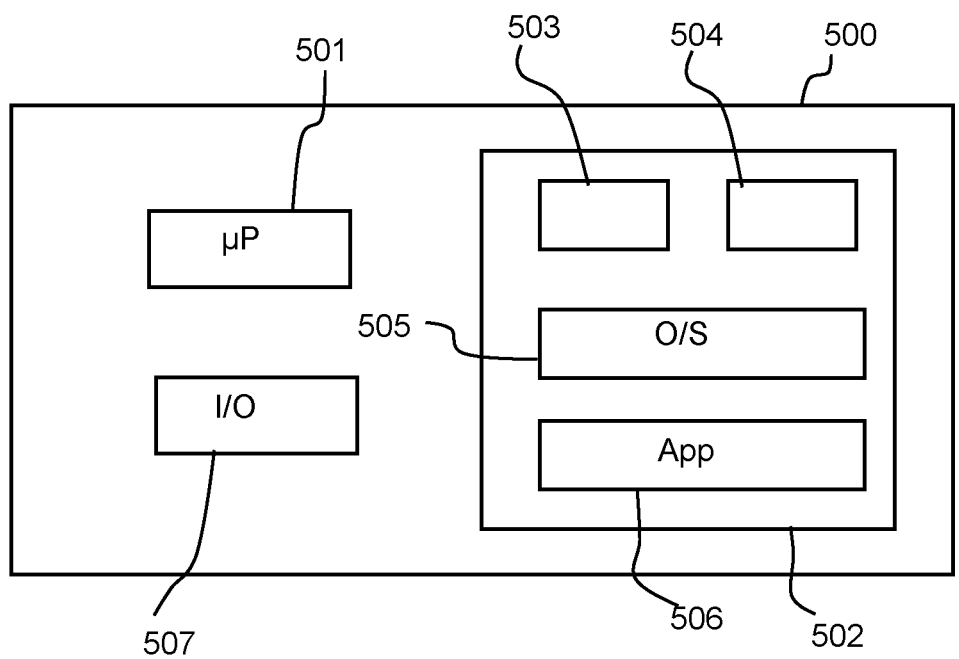
FIG. 5 illustrates a processing system according to an embodiment.

By way of further example, FIG. 5 illustrates an example of a processing system 500 within which one or more parts of an embodiment may be employed. Various operations discussed above may utilize the capabilities of the processing system 500. For example, one or more parts of a system for processing 3D image data using a neural network architecture may be incorporated in any element, module, application, and/or component discussed herein. In this regard, it is to be understood that system functional blocks can run on a single computer or may be distributed over several computers and locations (e.g. connected via internet).

The processing system 500 includes, but is not limited to, PCs, workstations, laptops, PDAs, palm devices, servers, storages, and the like. Generally, in terms of hardware architecture, the processing system 500 may include one or more processors 501, memory 502, and one or more I/O devices 507 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 501 is a hardware device for executing software that can be stored in the memory 502. The processor 501 can be virtually any custom made or commercially available processor, a central processing unit (CPU), a digital signal processor (DSP), or an auxiliary processor among several processors associated with the processing system 500, and the processor 501 may be a semiconductor based microprocessor (in the form of a microchip) or a microprocessor.

The memory 502 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 502 may incorporate electronic, magnetic, optical, and/or other types of storage media. Note that the memory 502 can have a distributed architecture, where various components are situated remote from one another, but can be accessed by the processor 501.

The software in the memory 502 may include one or more separate programs, each of which comprises an ordered listing of executable instructions for implementing logical functions. The software in the memory 502 includes a suitable operating system (O/S) 505, compiler 504, source code 503, and one or more applications 506 in accordance with exemplary embodiments. As illustrated, the application 506 comprises numerous functional components for implementing the features and operations of the exemplary embodiments. The application 506 of the processing system 500 may represent various applications, computational units, logic, functional units, processes, operations, virtual entities, and/or modules in accordance with exemplary embodiments, but the application 506 is not meant to be a limitation.

The operating system 505 controls the execution of other computer programs, and provides scheduling, input-output control, file and data management, memory management, and communication control and related services. It is contemplated by the inventors that the application 506 for implementing exemplary embodiments may be applicable on all commercially available operating systems.

Application 506 may be a source program, executable program (object code), script, or any other entity comprising a set of instructions to be performed. When a source program, then the program is usually translated via a compiler (such as the compiler 504), assembler, interpreter, or the like, which may or may not be included within the memory 502, so as to operate properly in connection with the O/S 505. Furthermore, the application 506 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 507 may include input devices such as, for example but not limited to, a mouse, keyboard, scanner, microphone, camera, etc. Furthermore, the I/O devices 507 may also include output devices, for example but not limited to a printer, display, etc. Finally, the I/O devices 507 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 507 also include components for communicating over various networks, such as the Internet or intranet.

If the processing system 500 is a PC, workstation, intelligent device or the like, the software in the memory 502 may further include a basic input output system (BIOS) (omitted for simplicity). The BIOS is a set of essential software routines that initialize and test hardware at startup, start the O/S 505, and support the transfer of data among the hardware devices. The BIOS is stored in some type of read-only-memory, such as ROM, PROM, EPROM, EEPROM or the like, so that the BIOS can be executed when the processing system 500 is activated.

When the processing system 500 is in operation, the processor 501 is configured to execute software stored within the memory 502, to communicate data to and from the memory 502, and to generally control operations of the processing system 500 pursuant to the software. The application 506 and the O/S 505 are read, in whole or in part, by the processor 501, perhaps buffered within the processor 501, and then executed.

When the application 506 is implemented in software it should be noted that the application 506 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 506 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Ordinal numbers (e.g. "first", "second" and so on) have been used purely to distinguish different elements from one another for the sake of clarity, and reference to a non-"first" (e.g. "second" or "third") element does not necessitate that a "first" element be present. The skilled person would be capable of relabeling any such elements as appropriate (e.g. relabeling a "second" element as a "first" element if only the second element is present).

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method for processing 3D image data using a neural network architecture, the computer-implemented method comprising:
   obtaining input 3D image data;
   performing a modified 3D image data generation process comprising:
      for each of a plurality of 3D sub-volumes of the input 3D image data, processing the 3D sub-volume using a first neural network to produce first modified 3D image data; and
      for each 2D image slice along a first dimension of the input 3D image data, processing the 2D image slice using a second neural network to produce second modified 3D image data; and
   processing the input 3D image data, together with at least the first modified 3D image data and the second modified 3D image data, using an outputting neural network to produce an output of the neural network architecture.

2. The computer-implemented method of claim 1, wherein processing the input 3D image data, together with the second modified 3D image data and the first modified 3D image data, comprises:
   for each 2D image slice along a second dimension of the input 3D image data, different to the first dimension:
      obtaining a corresponding 2D image slice from the first modified 3D image data and the second modified 3D imaging data; and
      processing the 2D image slice of the input 3D image data, together with at least the corresponding 2D image slice from the first modified 3D image data and the corresponding slice from the second modified 3D imaging data, using the outputting neural network to produce a processed 2D image slice,
   wherein the combination of the processed 2D image slices forms the output of the neural network architecture.

3. The computer-implemented method of claim 2, wherein the input 3D image data is a medical image of a subject, and each 2D image slice along the first dimension is a slice lying in a coronal or sagittal plane of the subject, and each 2D image slice along the second dimension is a slice lying in an axial plane of the subject.

4. The computer-implemented method of claim 2, wherein:
   the modified 3D image data generation process further comprises, for each 2D image slice along a third dimension of the input 3D image data, processing the 2D image slice along the third dimension using a third neural network to produce third modified 3D image data;
   the third dimension is different to the first dimension; and
   the processing of the input 3D image data, together with at least the first modified 3D image data and the second modified 3D image data, comprises processing at least the input 3D image data, the second modified 3D image data and the third modified 3D image data using the outputting neural network to produce the output of the neural network architecture.

5. The computer-implemented method of claim 4, wherein processing the input 3D image data, together with at least the first modified 3D image data and the second modified 3D image data, comprises:
   for each 2D image slice along the second dimension of the input 3D image data:
   obtaining a corresponding 2D image slice from the second modified 3D image data;
   obtaining a corresponding 2D image slice from the third modified 3D image data and
   processing the 2D image slice of the input 3D image data, together at least with the corresponding 2D image slice from the second modified 3D image data and the corresponding slice from the third modified 3D imaging data, using the outputting neural network to produce a processed 2D image slice, wherein the combination of the processed 2D image slices forms the output of the neural network architecture.

6. The computer-implemented method of claim 4, wherein the processing the input 3D image data, together with at least the first modified 3D image data and the second modified 3D image data, comprises processing the input 3D image data, the first modified 3D image data, the second modified 3D image data and the third modified 3D image data using the outputting neural network to produce the output of the neural network architecture.

7. The computer-implemented method of claim 6,
wherein processing the input 3D image data, together with at least the first modified 3D image data and the second modified 3D image data, comprises:
for each 2D image slice along the second dimension of the input 3D image data:
obtaining a corresponding 2D image slice from the first modified 3D image data;
obtaining a corresponding 2D image slice from the second modified 3D image data;
obtaining a corresponding 2D image slice from the third modified 3D image data; and
processing the 2D image slice of the input 3D image data, together with at least the corresponding 2D image slice from the first modified 3D image data and the corresponding slice from the second modified 3D imaging data and the corresponding slice from the third modified 3D imaging data, using the outputting neural network to produce a processed 2D image slice,
wherein the combination of the processed 2D image slices forms the output of the neural network architecture.

8. The computer-implemented method of claim 4, wherein:
the input 3D image data is a medical image of a subject;
each 2D image slice along the first dimension is a slice lying in a coronal plane of the subject;
each 2D image slice along the second dimension is a slice lying in an axial plane of the subject; and
each 2D image slice along the third dimension is a slice lying in a sagittal plane of the subject.

9. The computer-implemented method of claim 4, wherein the second neural network and the third neural network are one and the same.

10. The computer-implemented method of claim 4, wherein the second neural network and the third neural network are different.

11. The computer-implemented method of claim 1, wherein each of the first, second and outputting neural networks have a U-net architecture.

12. The computer-implemented method of claim 1, wherein the size of each of the plurality of sub-volumes is no greater than one sixteenth of the size of the input 3D image data.

13. A system for processing 3D image data using a neural network architecture, the system comprising:
a memory that stores a plurality of instructions; and
a processor coupled to the memory and configured to execute the plurality of instructions to:
obtain input 3D image data;
perform a modified 3D image data generation process comprising:
for each of a plurality of 3D sub-volumes of the input 3D image data, processing the 3D sub-volume using a first neural network to produce first modified 3D image data; and
for each 2D image slice along a first dimension of the input 3D image data, processing the 2D image slice using a second neural network to produce second modified 3D image data; and
process the input 3D image data, together with at least the first modified 3D image data and the second modified 3D image data, using an outputting neural network to produce an output of the neural network architecture.

14. A non-transitory computer readable medium comprising executable instructions which, when executed by at least one processor, cause the at least one processor to perform a method for processing 3D image data using a neural network architecture, the method comprising:
obtaining input 3D image data;
performing a modified 3D image data generation process comprising:
for each of a plurality of 3D sub-volumes of the input 3D image data, processing the 3D sub-volume using a first neural network to produce first modified 3D image data; and
for each 2D image slice along a first dimension of the input 3D image data, processing the 2D image slice using a second neural network to produce second modified 3D image data; and
processing the input 3D image data, together with at least the first modified 3D image data and the second modified 3D image data, using an outputting neural network to produce an output of the neural network architecture.

* * * * *